US005764023A

United States Patent [19]
Wieloch

[11] Patent Number: 5,764,023
[45] Date of Patent: Jun. 9, 1998

[54] MOTOR CONTROLLER WITH CIRCUIT INTERRUPTER AND METHOD FOR INTERRUPTING POWER TO A MOTOR CONTROLLER

[75] Inventor: Christopher J. Wieloch, Brookfield, Wis.

[73] Assignee: Allen Bradley Company, Inc., Milwaukee, Wis.

[21] Appl. No.: 819,471

[22] Filed: Mar. 17, 1997

Related U.S. Application Data

[63] Continuation of Ser. No. 433,774, May 3, 1995.

[51] Int. Cl.$^6$ ................................................. H02P 5/34
[52] U.S. Cl. ................................................. 318/803; 318/806
[58] Field of Search ....................... 318/134, 139, 318/254, 434, 140, 148, 727, 803, 806, 801, 802

[56] References Cited

U.S. PATENT DOCUMENTS

| | | | |
|---|---|---|---|
| 4,475,150 | 10/1984 | D'Atre et al. | 363/51 |
| 4,545,002 | 10/1985 | Walker | 318/801 |
| 4,680,512 | 7/1987 | Melocik | 318/139 |
| 4,747,061 | 5/1988 | Lagree et al. | 364/483 |
| 4,884,182 | 11/1989 | Ando et al. | 363/37 |
| 4,894,763 | 1/1990 | Ngo | 318/803 X |
| 4,959,602 | 9/1990 | Scott et al. | 318/803 |
| 5,126,643 | 6/1992 | French | 318/434 |
| 5,276,292 | 1/1994 | Goto et al. | 318/759 X |
| 5,420,491 | 5/1995 | Kanzaki et al. | 318/727 |

*Primary Examiner*—Brian Sircus
*Attorney, Agent, or Firm*—Patrick S. Yoder; John M. Miller; John J. Horn

[57] ABSTRACT

A variable frequency motor drive incorporating a circuit interrupter includes a rectifying circuit for converting incoming AC power to DC power and an inverting circuit for converting the DC power to controlled AC power in response to control signals. A control circuit implements a preset control routine to control operation of the inverting circuit to drive a motor in accordance with desired operating parameters. A circuit interrupter is coupled between the source of AC power and the rectifying circuit and includes an actuator for interrupting power to the drive in response to interrupt command signals from the motor control circuit. The motor drive includes a switching circuit and a capacitive circuit for powering the circuit interrupter. The drive control circuitry monitors operation of the drive and the motor and when conditions require removal of power to the drive, the control circuitry commands the switching circuit to close, energizing the circuit interrupter and thereby removing power to the drive. The circuit interrupter includes a manual disconnect for selectively removing power to the drive. The manual disconnect can be locked out for servicing of the motor or the drive.

15 Claims, 3 Drawing Sheets

MOTOR CONTROLLER WITH CIRCUIT INTERRUPTER AND METHOD FOR INTERRUPTING POWER TO A MOTOR CONTROLLER

This is a continuation, Ser. No. 08/433,774 filed on May 3, 1995, now abandoned.

BACKGROUND OF THE INVENTION

The present invention relates generally to field of motor controllers for driving alternating current motors. More particularly, the invention relates to an adjustable frequency motor controller including an integral circuit interrupter capable of removing power to the controller as necessary to prevent or limit damage due to output short circuits, motor overload or other undesirable events. The invention also relates to a method for interrupting power to a motor controller.

For applications requiring starting and stopping of an electric motor, it is common practice in the field of motor controls to provide a conventional motor starter with protective devices such as fuses, circuit breakers and the like. Such protective devices are generally intended to guard the motor, switching devices in the starter and the electrical system infrastructure, particularly wiring, against harmful overloads that would otherwise permanently damage or destroy these components. In addition to this overload protection function, circuit interrupting devices for common motor starters typically include a lockout device such as a lockable lever or other arrangement for positively locking the starter in an open position (i.e. power disconnected) during servicing of the motor or electrical system.

While such conventional motor starting hardware generally provides satisfactory protection against common short circuit and overload conditions, they often lead to costly downtime, particularly when replacement of expendable elements, such as fuses, is required. Moreover, as additional protective devices are incorporated into the motor starter system, the overall cost of the system increases substantially. In an effort to reduce downtime and the number of separate protective devices in motor starter systems, more sophisticated devices have been developed, such as semiconductor fuses. However, such devices are relatively expensive and still require replacement in the event of an overload or short circuit.

Another response to the need for reliable motor controls with overload and short circuit protection has appeared in the form of integrated motor starters. These starters typically incorporate magnetically operated contactors with integral short circuit protection, generally providing visual indication of a tripped condition. Moreover, integrated motor starters generally reduce downtime by remaining operational despite certain types of short circuit and, like conventional motor starters, may be physically locked out for service. Such devices represent an advance over conventional motor starters alone, they typically offer very limited control capabilities, such as ramped starting, and do not permit selection of motor speed and other desirable motor performance parameters.

In recent years much more sophisticated motor drive controllers have been developed that offer a wide range of control options, including controlled motor starting, not available in conventional motor starters and integrated starters. Such motor controllers typically include a rectifying circuit for converting incoming alternating current power to direct current power and an inverting circuit, including solid state switching devices such as insulated gate bi-polar transistors (IGBT's), under the direction of a control circuit. The microprocessor-based control circuit provides a control signal to the inverting circuit in accordance with a predetermined cyclic control routine. In response to the control signal, the inverting circuit converts the direct current power to controlled waveform alternating current power to drive a motor. By regulating the characteristics of the output waveforms, the controller can drive the motor at desired speeds and optimize performance of the motor. Due to advances in solid state circuitry, economical motor controllers of this type are now commonly available for both large and small motors (e.g. below 5 horsepower).

Although motor controllers of this type are capable of detecting overload and short circuit conditions and of tripping to avoid damage to system components, heretofore they have not included the capability to physically interrupt or disconnect the circuits feeding incoming power to the controller when such conditions are detected. Moreover, such motor controllers do not generally provide for physically disconnecting and locking out the drive for servicing. Therefore, despite the considerable convenience of such controllers, particularly in regulating the output speed of induction motors, they nevertheless do not eliminate the need for circuit interrupting and lockout devices.

The present invention advantageously provides a novel variable frequency motor controller including a interrupt module capable of interrupting incoming power to the controller in the event the controller detects an undesirable condition, such as an overload or short circuit. An actuator in the interrupt module may be tripped by the controller or may be opened and locked out manually for servicing the motor or drive system. Because in automatic operation the interrupter is commanded by the controller, tripping is extremely fast and can be controlled by criteria set in the control routine implemented by the controller. This flexibility in control can avoid unwanted or unnecessary trips while allowing power to be disconnected in anticipation of overload and upon the occurrence of other events as detected by the controller. Moreover, by coupling the controller to a larger control network, power can be interrupted by remote operation or upon the occurrence of remotely sensed events.

SUMMARY OF THE INVENTION

In accordance with a first aspect of the invention, a controller for regulating the operation of an electric motor includes a rectifying circuit, an inverting circuit, a power interrupter assembly, a switching device and a control circuit. The rectifying circuit is coupled to a plurality of incoming power conductors for converting alternating current power from a source to direct current power. The inverting circuit, coupled to the rectifying circuit via a direct current bus, converts the direct current power from the rectifying circuit to controlled alternating current power for driving the motor. The power interrupter assembly includes a circuit interrupter coupled to the rectifying circuit via the incoming power conductors. The interrupter is configured for coupling to the source of alternating current power. The interrupter is movable between closed and opened positions for selectively transmitting and interrupting power to the rectifying circuit. The interrupter assembly also includes an actuator for opening the interrupter in response to an interrupt command signal. The switching device is coupled to the actuator and to the control circuit and applies the circuit interrupt command signal to the actuator in response to a control signal from the control circuit. The control circuit is coupled to the switching device and applies a command signal to the switching device to cause interruption of power to the rectifying circuit.

In accordance with another aspect of the invention, a power interrupter module is provided in a motor controller. The motor controller is of the type including a rectifying circuit, an inverting circuit, a switching device and a control circuit. The rectifying circuit is coupled to a plurality of incoming power conductors for converting alternating current power from a source to direct current power. The inverting circuit, coupled to the rectifying circuit via a direct current bus, converts direct current power from the rectifying circuit to controlled alternating current power for driving a motor. The switching device provides a circuit interrupt command signal in response to a control signal and the control circuit, coupled to the switching device, generates and applies a control signal to the switching device to cause interruption of power to the rectifying circuit. The power interrupter module includes a circuit interrupter for coupling between the rectifying circuit via the incoming power conductors and the source of alternating current power. The circuit interrupter is movable between closed and opened positions for selectively transmitting and interrupting power to the rectifying circuit. The module further includes an actuator for opening the circuit interrupter in response to the circuit interrupt command signal from the switching device.

In accordance with a further aspect of the invention, a method is provided for interrupting power to a motor controller. The motor controller includes motor drive circuitry comprising a rectifying circuit, an inverting circuit and a control circuit. The rectifying circuit may be coupled to a plurality of incoming power conductors for converting alternating current power from a source to direct current power. The inverting circuit is coupled to the rectifying circuit via a direct current bus and converts the direct current power to controlled alternating current power for driving the motor in response to control signals. The control circuit is coupled to the inverting circuit and generates and applies control signals to the inverting circuit to control its operation. The controller further includes a monitoring circuit coupled to the motor drive circuitry for detecting operating conditions of the motor controller. The method includes the steps of monitoring operating conditions of the motor drive circuitry and identifying trip conditions requiring removal of power to the motor controller. In response to such trip conditions, a circuit interrupt command signal is generated and applied to a circuit interrupter to remove incoming power to the motor controller.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
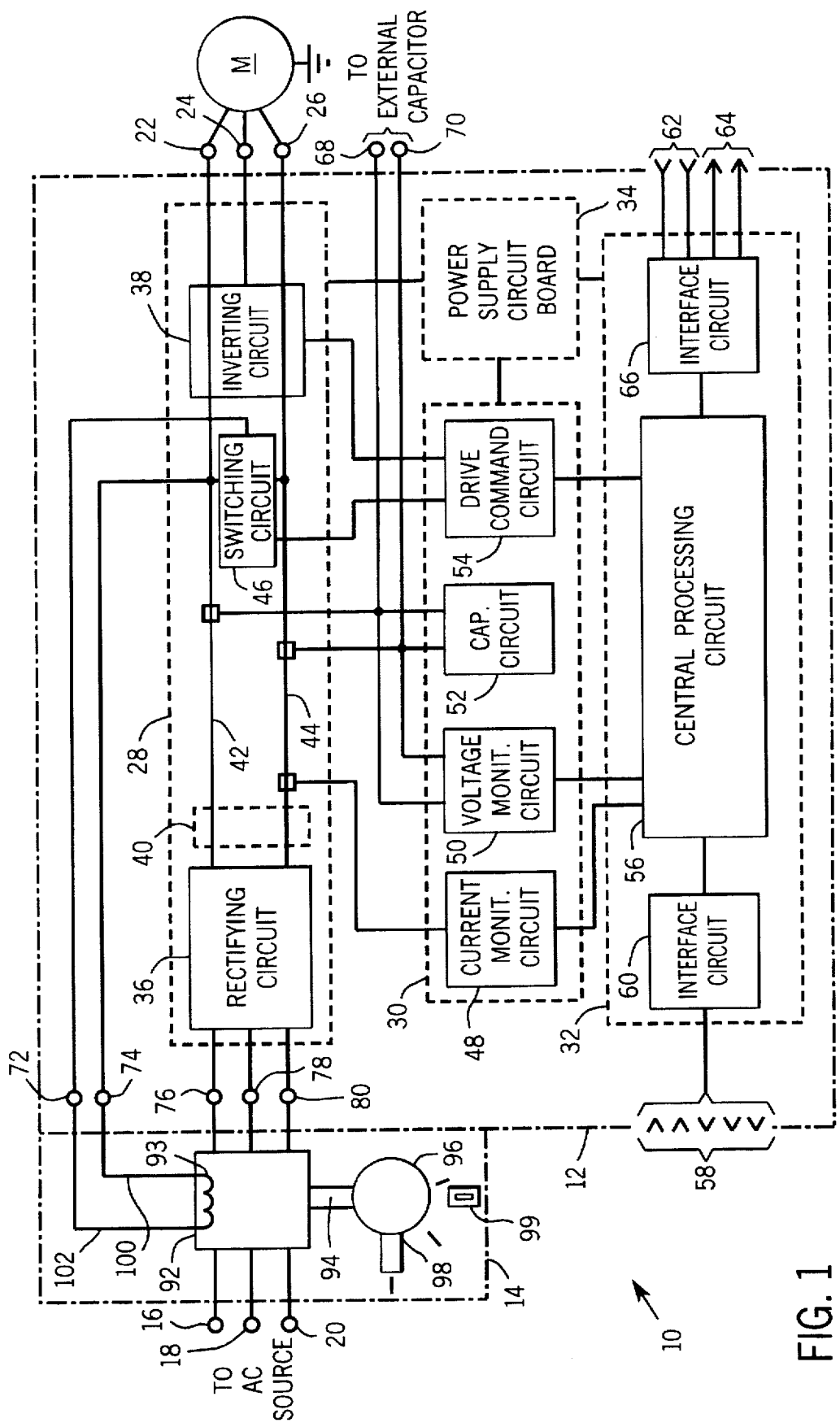
FIG. 1 is a diagrammatical illustration of a motor controller including a disconnect module in accordance with the invention, wherein various circuits comprising the controller and disconnect module and interconnections between the circuits are represented schematically.

Turning now to the drawings and referring to FIG. 1, an assembled motor controller or drive and circuit interrupter package 10 includes a motor drive 12 coupled to an interrupter assembly or module 14. While various physical configurations may be envisioned for motor drive 12 and interrupter assembly 14, motor drive 12 will typically be a complete motor controller as described below, of generally known construction, such as the Bulletin 1305 adjustable frequency motor controllers available from the Allen-Bradley Company of Milwaukee, Wisconsin. Interrupter assembly 14 is preferably constructed in modular form adapted to be added or mounted onto motor drive 12. This modular construction has the advantage of permitting motor drive 12 to be built and installed without interrupter assembly 14 where desired, but combined with assembly 14 in a simple, unitary structure where the interrupter features of assembly 14 are needed in the complete drive package 10.

As illustrated in FIG. 1, drive package 10 includes input terminals 16, 18, 20 for connection to incoming phase conductors from a source of AC power and output terminals 22, 24, 26 for coupling to an electric motor M, the performance (e.g. speed and torque) of which is controlled by package 10. In the assembled drive package 10, input terminals 16, 18, 20 are included on interrupter assembly 14 to route incoming AC power through the circuit interrupter hardware described below and into motor drive 12, while outgoing terminals 22, 24, 26 are integral with motor drive 12 to route controlled AC power to motor M from the drive circuitry.

Figure 2:
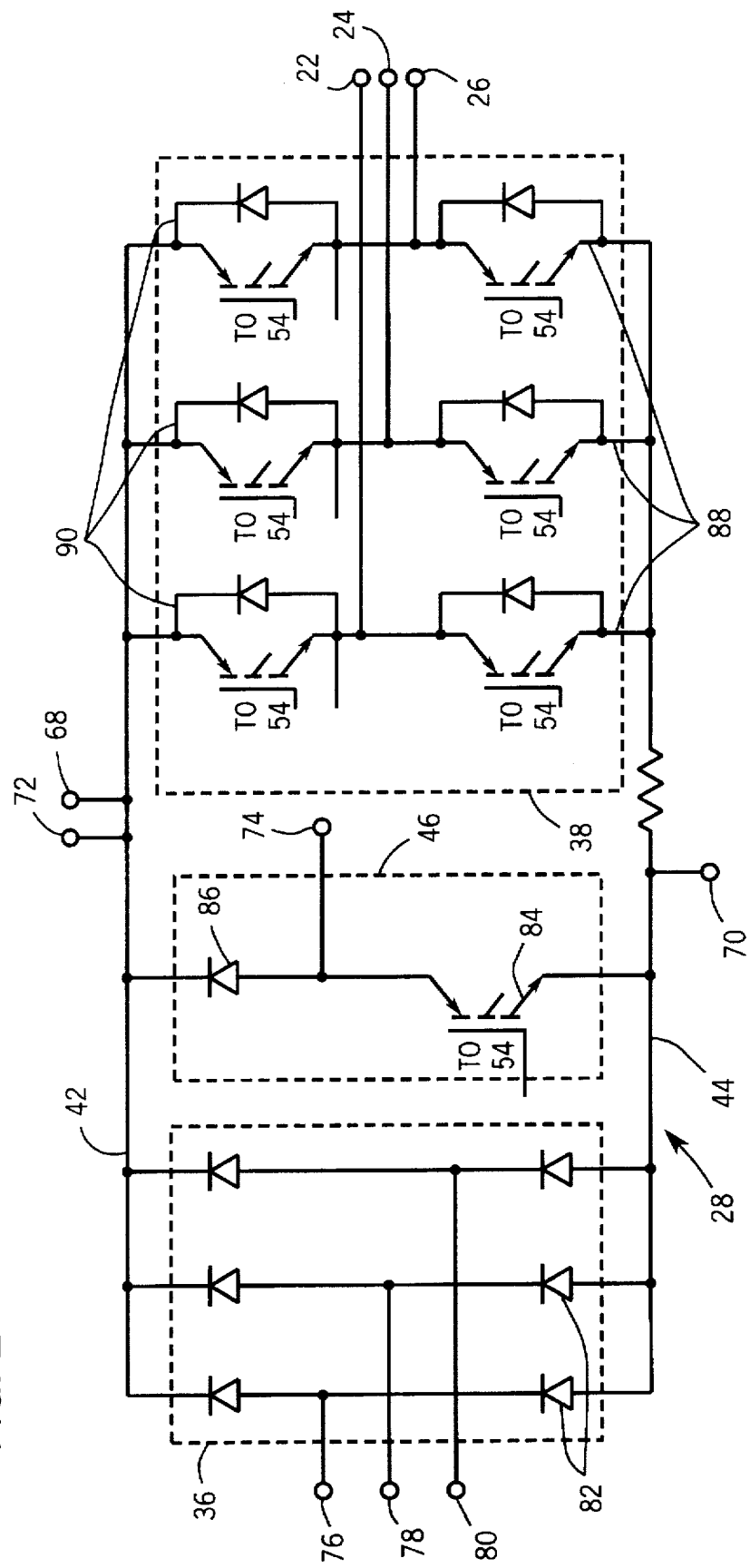
FIG. 2 is a schematic illustration of the circuits supported on a power substrate module of the motor controller of FIG. 1.

As illustrated in FIGS. 1 and 2, motor drive 12 is a variable frequency motor drive comprising a number of interconnected circuits, included on a power substrate module 28, a control circuit board 30, a logic circuit board 32 and a power supply circuit board 34. Each of these circuit boards supports various circuit components interconnected by conducting paths to form the functional circuits described below. The internal configurations of the individual circuits included on these circuit boards are of types generally known in the art, such as the circuits incorporated in the Bulletin 1305 motor drives available from the Allen-Bradley Company of Milwaukee, Wis.

Power substrate module 28 includes a rectifying circuit 36 and an inverting circuit 38 coupled to the rectifying circuit by an internal DC bus 40 having a high voltage side 42 and a low voltage side 44. Upon installation of drive package 10, rectifying circuit 36 is coupled to a source of AC power through interrupter assembly 14 via incoming phase terminals 16, 18, 20. Rectifying circuit 36 converts incoming AC power to DC power which is output on DC bus 40. Inverting circuit 38, in turn, converts the DC power from bus 40 to controlled AC power in response to drive command signals from a drive command circuit 54 as described below. This controlled AC power is applied to output terminals 22, 24, 26 to control the performance of a motor M coupled to the output terminals. In addition, a switching circuit 46 is coupled between high and low sides 42 and 44 of DC bus 40 for transmitting power to an external device, such as external brake resistor (not shown) or, in the assembled drive package 10 as illustrated, to interrupter assembly 14 as described below.

Control circuit board 30 includes circuits for monitoring certain operating parameters associated with motor M and drive 12, as well as for converting control signals from logic circuit board 32 to drive command signals for controlling the operation of inverting circuit 38. Thus, control circuit board 30 supports a current monitoring circuit 48 coupled to low side 44 of DC bus 40 for continuously detecting the current through bus 40. Similarly, a voltage monitoring circuit 50 is coupled to both high and low sides 42 and 44 of DC bus 40 and continuously detects the voltage across bus 40. Additional monitoring circuits (not shown), such as a temperature monitoring circuit, may also be included on control circuit board 30. Control circuit board 30 also supports a capacitive circuit 52 including capacitors coupled across DC bus 40 for storing energy during operation of motor drive 12. In addition, control circuit board 30 includes drive command circuit 54 which generates drive command signals for controlling inverting circuit 38 in response to control signals.

Logic circuit board 32 includes a central processing circuit 56 configured to monitor operation of motor drive 12 and to generate control signals for regulating the performance of motor M and interrupter assembly 14. Central processing circuit 56 preferably includes a programmed microprocessor and, internal or external to the microprocessor, an analog-to-digital converter, memory circuitry and signal processing circuitry for storing and executing a predetermined cyclic control routine for driving motor M, as discussed in greater detail below. Central processing circuit 56 is coupled to monitoring circuits 48 and 50 and receives signals representative of the DC bus current and voltage from the monitoring circuits. These signals are converted to digital values at a predetermined sampling interval for use in the cyclic control routine implemented by circuit 56. Central processing circuit 56 is also coupled to drive command circuit 54 and communicates control signals to drive command circuit 54 for driving motor M and for controlling opening and closing of switching circuit 46.

In addition to inputs from current and voltage monitoring circuits 48 and 50, logic circuit board 32 is typically coupled to a number of input and output channels, designated generally by reference numeral 58. Channels 58 may be coupled to various devices and circuits internal or external to motor drive 12, such as start and stop circuits, reverse and jog switches, and the like. Channels 58 may also be coupled to an operator interface (not shown) for inputting configuration, control parameters, desired operating parameters (e.g. desired output frequency or speed, rated currents and voltages) and the like into motor drive 12 and for verifying or updating the set or current values of such parameters, such as via an output display (not shown). Channels 58 may include serial or parallel data transmission lines for communicating with central processing circuit 56, preferably through an interface circuit 60 that includes opto-isolation for protecting central processing circuit 56 from power surges. Moreover, central processing circuit 56 may receive additional input signals through one or more ports 62. For example, one such port 62 may be coupled to a potentiometer (not shown) for generating and supplying controller 10 with a target or desired drive signal frequency or motor output speed. Other ports 62 may be provided for various programming and control interface devices, such as a hand-held human interface module (not shown) or remote digital computer link. Such remote links may be used to control both the performance of motor M as well as the opening and closing of switching circuit 46 for remotely controlling interruption of power to drive 12 upon the detection or occurrence of a predetermined event as described in greater detail below. One or more output or monitoring ports 64 are preferably linked to central processing circuit 56, along with appropriate analog circuitry, for selectively monitoring the various operating parameters of drive 12, such as the desired and actual drive signal frequency or motor speed from a remote location. Interface circuitry, designated generally at 66, is provided for isolating and conditioning the signals communicated to and from central processing circuit 56 through ports 62 and 64.

Several conductor terminals are provided on motor drive 12 to permit the various circuits described above to be coupled to devices or circuits external to drive 12. As previously mentioned, output terminals 22, 24 and 26 are provided for coupling drive 12 to motor M, while input terminals 16, 18 and 20 are provided on interrupter module 14. In addition to these terminals, two terminals 68 and 70 are provided for coupling an external capacitor (not shown) to the high and low sides of DC bus 40. Two additional terminals 72 and 74 are provided for coupling an external device to switching circuit 46 as discussed in greater detail below. Where motor drive 12 is installed without interrupter module 14, terminals 72 and 74 may typically be coupled to an external dynamic braking resistor in a manner generally known in the art. However, when interrupter module 14 is provided along with motor drive 12, switching circuit 46 is conveniently used to drive the interrupting circuitry within module 14. Similarly, input terminals 76, 78 and 80 are preferably provided on motor drive 12 for coupling rectifying circuit 36 to a source of AC power. When interrupter module 14 is installed with motor drive 12, terminals 76, 78 and 80 are conveniently coupled to output lines from module 14 to permit interruption of power to the terminals. To facilitate coupling motor drive 12 to incoming power conductors when drive 12 is installed without interrupter module 14, terminals 76, 78 and 80, like input terminals 16, 18 and 20 and output terminals 22, 24 and 26, are preferably configured as standard screw lug terminals of the type well known in the art.

The principal functional elements of the circuits included in power substrate module 28 are illustrated schematically in FIG. 2. As shown, rectifying circuit 36 includes a plurality of diodes 82 coupled to input terminals 76, 78, 80 and to the high and low sides 42, 44 of DC bus 40 to form a full wave rectifier. Switching circuit 46 includes a switching device 84, such as an IGBT, in series with a diode 86 between high and low sides 42, 44 of DC bus 40. Terminal 74 is coupled between switching device 84 and diode 86, while terminal 72 is coupled to the high voltage side 42 of DC bus 40. Switching device 84 is coupled to central processing circuit 56 through drive command circuit 54 and responds to switching signals from circuit 56 to permit current flow from the high voltage side 42 of DC bus 40, through an external device, such as a resistor or interrupter module 14 coupled to terminals 72 and 74 to the low voltage side 44 of DC bus 40. Thus, by closing switching device 84, central processing circuit 56 can apply dynamic braking of motor M through an external resistor or can interrupt power to drive 12 by operation of circuitry in interrupter module 14 as described below.

Inverting circuit 38 includes three pairs of switching devices, each pair including a low side device 88 and a high side device 90. Each low and high side switching device 88, 90 in turn includes an IGBT and a diode coupled between the transistor's emitter and collector. Moreover, in each pair of switching devices, the collector of the high side device 90 is coupled to the high side 42 of the DC bus. The emitter of the high side device 90 is coupled to the collector of the low side device 88 and the emitter of the low side device 88 is coupled to the low side 44 of the DC bus. Each switching device is coupled to a suitable power source, such as an 18 volt source originating on power supply board 34 or to a capacitor charge pump circuit (not shown), as well as to central processing circuit 56 through drive command circuit 54. Output terminals 22, 24 and 26 are coupled between the pairs of switching devices. Devices 88 and 90 are directed to conduct between the output terminals and the DC bus low side 44 and between the DC bus high side 42 and the output terminals, respectively, in response to drive control signals from drive command circuit 54. These drive control signals are based upon logic control signals from central processing circuit 56. Thus, central processing circuit 56 directs switching devices 88 and 90 to convert DC power from DC bus 40 to AC power that is output through terminals 22, 24 and 26.

Returning to FIG. 1, interrupter module 14 includes a circuit interrupter 92 having an actuator, represented schematically at 93, for electrically disconnecting power to motor drive 12 in response to electrical interrupt command signals from switching circuit 46. Interrupter 92 and actuator 93 are maintained-type devices that remain in an open (i.e. power interrupted) position once tripped either electrically or manually. Circuit interrupter 92 is mechanically or electronically coupled via a rotational shaft or a similar mechanical actuating linkage 94 to a manual lever or knob 96 having a handle 98 for selectively manually interrupting power to motor drive 12. Manual lever 96 preferably includes several operative positions corresponding to the physical condition of circuit interrupter 92, including an "on" position, an "off" position, a "trip" position and a "reset" position. Manual lever 96 also preferably includes a physical lockout, represented schematically at 99, for maintaining lever 96 in the "off" position and preventing accidental application of power to motor drive 12. Moreover, manual lever 96 may include a physical lockon arrangement for preventing power from being manually removed from drive 12 where drive package 10 is installed on certain sensitive motor applications where power should not be removed from motor M. Actuator 93 of circuit interrupter 92 is electrically coupled to switching circuit 46 through terminals 72 and 74 and internal conductors 100 and 102. The particular configurations of circuit interrupter 92, actuator 93, manual lever 96 and lockout 99 may be of types generally known in the field, such as the manual interrupter and trip devices available from the Allen-Bradley Company of Milwaukee, Wis. under the model numbers 190-MN and 190-P100L. For example, actuator 93 may be a magnetic trip unit including a solenoid-operated tripping device and manual lever 96 and mechanical linkage 94 may be a rotary handle and toggle linkage of the type permitting snap-action physical disconnection of incoming AC power. Interrupter module 14 also preferably includes a visual indicator (not shown) providing a readily visible indication of the operative state of circuit interrupter 92.

Figure 3:
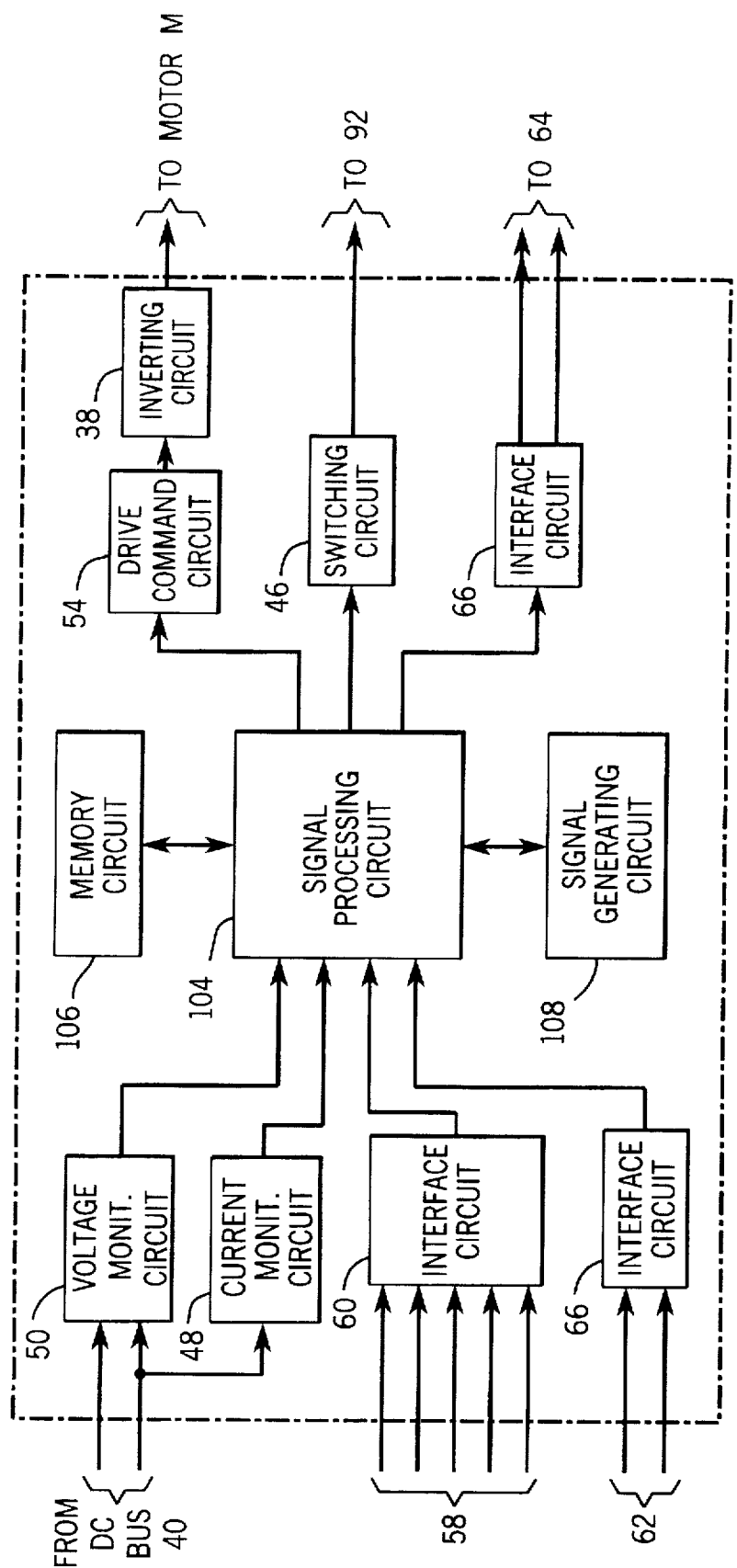
FIG. 3 is a signal flow diagram illustrating the communication of various monitoring and control signals between the functional circuits of the controller for regulating performance of the motor and for commanding tripping of the disconnect.

The functional interconnection of the various circuits and devices described above is represented schematically in FIG. 3. As shown in FIG. 3, central processing circuit 56 includes internal circuitry, typically defined during configuration of circuit 56, including a signal processing circuit 104, a memory circuit 106 (which may include memory external to circuit 56, such as random access memory, read only memory or electrically erasable programmable read only memory) and an interrupt command signal generating circuit 108. Memory circuit 106 and interrupt command signal generating circuit 108 communicate with signal processing circuit 104 to perform logical operations based upon sensed operating parameters and preset calibration or desired operating parameters to execute a predetermined control routine as discussed further below. It should be understood that central processing circuit 56 typically includes other functional circuitry, also established through configuration or programming. Such circuits may be of a type generally known in the art and have not been represented in FIG. 3 for simplicity.

Motor drive package 12 receives signals from several sources, including DC bus 40, channels 58 and ports 62. Monitoring circuits 48 and 50 are coupled to the DC bus and generate DC bus voltage and current signals that are transmitted to signal processing circuit 104 for use in the control routine implemented by central processing circuit 56. Based upon the preset and sensed parameters and upon the control routine implemented by circuit 56, signal processing circuit 104 generates control signals for driving motor M and transmits these control signals through drive command circuit 54 to inverting circuit 38. Preset and sensed values relating to operation of motor M may be accessed from signal processing circuit 104 through ports 64 via interface circuitry 66. In addition, when current or anticipated conditions warrant interruption of power to drive 12, interrupt command signal generating circuit 108 commands signal processing circuit 108 to close switching device 84 in switching circuit 46 to energize actuator 93 in circuit interrupter 92, thereby removing power from motor drive 12. Capacitive circuit 52 stores sufficient energy during the time power is coupled to drive 12 to operate circuit interrupter 92 in response to closing of switching circuit 46.

In operation, motor drive 12 controls operation of motor M as follows. Memory circuitry 106 of central processing circuit 56 stores a cyclic control routine including features such as ramped acceleration, ramped deceleration, characteristic speed curves for particular applications, such as for pump drive applications, and so on. Such control routines are generally known in the art, such as the routines implemented in the Bulletin 1305 drives from the Allen-Bradley Company of Milwaukee, Wis. In addition, calibration values and operating parameters, such as desired speed or frequency may be input to central processing circuit 56 via a manual or computer networked interface, such as through channels 58 and ports 62. Based upon these values and the preset control routine, central processing circuit 56 generates logic control signals and applies them to drive command circuit 54. Drive command circuit 54 in turn generates drive control signals and applies them to inverting circuit 38. The logic and drive control signals direct the switching devices of inverting circuit 38 to switch off and on so as to convert the DC power in DC bus 40 to AC power in the form of adjustable frequency pulse-width-modulated drive signals for driving motor M at a desired speed. This controlled AC power is applied to motor M via output terminals 22, 24 and 26.

As part of the cyclic control routine implemented by central processing circuit 56, interrupt command signal generating circuit 108 preferably compares sensed or computed values for motor operating parameters with reference values to determine whether power should be interrupted to motor drive 12. Where conditions require interruption of power, circuit 108 commands signal processing circuit 104 to generate and apply an appropriate control signal to switching device 84, causing switching device 84 to close and thereby applying an interrupt command signal to actuator 93. The closure of switching device 84 effectively places actuator 93 across DC bus 40 and, drawing power from capacitive circuit 52, actuator 93 draws circuit interrupter 92 into an open or tripped position. Once tripped, circuit interrupter 92 remains in the open position, interrupting power to motor drive 12 until reset.

Several such interrupt, or "trip" conditions are preferably included in the control routine. In a first scenario, circuits 108 and 104 command interruption of power to drive 12 when current monitoring circuit 48 detects that current to motor M has risen to an unacceptably high level, such as due to a phase short circuit. Similarly, circuits 108 and 104 may command interruption of power when current monitoring circuit 48 detects elevated current consistent with a locked rotor condition. Moreover, to preempt overload or overcurrent conditions in drive 12 or motor M, circuit 56 may execute a series of calculations as part of the cyclic control routine designed to identify a trend in an operating parameter, such as DC bus current or rms phase current, that, if allowed to continue, would result in overload, overcurrent or another potentially damaging condition. Such subroutines, generally known as "trending algorithms" are generally known in the art and provide an extremely rapid and effective way to avoid potential damage to both drive 12 and motor M.

It should be noted that, although the various trip criteria and subroutines that form the basis for actuation of circuit interrupter 92 may be similar or identical to those implemented by known motor drive systems, the operation of motor drive 12 in cooperation with interrupter module 14 offers considerable advantages over existing motor drives or motor drive 12 operating alone. First, while central processing circuit 56 is typically capable of preventing operation of inverting circuit 38 in the event of sensed or anticipated overcurrent or overload conditions, heretofore known motor controllers of this type have not been capable of physically interrupting power to the motor drive. On the contrary, the ability of heretofore known adjustable frequency motor controllers to prevent switching of inverting circuits in response to various trip conditions typically prevented tripping of upstream protective devices due to the relative speed of the controllers with respect to the circuit breakers. While integrated motor starters typically can disconnect power to a motor due to overloads, these devices generally cannot abort starts in anticipation of overload conditions and lack the ability to selectively control performance of the motors they start. By contrast, motor drive 12 in cooperation with circuit interrupter 92 can not only control or prevent operation of inverting circuit 38, but can command physical interruption of power to drive 12. Following such tripping, motor drive 12 can supply information relating to the conditions present prior to the trip and the reasons for power interruption. Furthermore, using generally known techniques for distinguishing between undesirable operating conditions, such as between short circuits and overloads, signal processing circuit 56 can be configured to command interruption of power in response to certain conditions (e.g. short circuits) but to continue operation despite other conditions (e.g. overload).

Moreover, by relying upon central processing circuit 56 to detect such conditions and trip circuit interrupter 92 rather than upon separate circuit protective devices upstream of drive 12, circuit interrupter 92 takes advantage of the extremely fast operation of the logical control elements of circuit 56. In addition, because motor drive 12 can be easily interfaced with external control inputs, package 10 can be networked into a more comprehensive control scheme and interruption of power to drive 12 can be commanded through central processing circuit 56 in response to a wide range of remote conditions. It should be noted also that capacitibe circuit 52 begins to store energy for powering circuit interrupter 92 from the time power is applied to motor drive 12. Thus, even when a condition requiring interruption of power to drive 12 is detected prior to or upon startup of motor M, capacitive circuit 12 will have sufficient energy to open interrupter 92.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, the presently preferred circuitry for powering circuit interrupter 92 includes switching circuit 46 and capacitive circuit 52. It is particularly convenient to employ these circuits for tripping circuit interrupter 92 because such circuits are typically included in existing motor drives of the type described and therefore require little adaptation for integration with circuit interrupter module 14. However, other tripping circuits may be included internally or externally to motor drive 12, including within interrupter module 14 itself. Similarly, an additional switching circuit, parallel to switching circuit 46 may be provided, permitting use of an external braking resistor in addition to interrupter module 14.

I claim:

1. A controller for regulating the operation of an electric motor comprising:

a power substrate circuit, the power substrate circuit including a rectifying circuit coupled to a plurality of incoming power conductors for converting alternating current power from a source to direct current power, the rectifying circuit providing the direct current power on a direct current bus, and an inverting circuit coupled to the rectifying circuit via the direct current bus, the inverting circuit converting the direct current power to controlled alternating current power for driving the motor;

a power interrupter assembly including a circuit interrupter coupled to the rectifying circuit via the incoming power conductors and configured for coupling to the source, the circuit interrupter being movable between closed and opened positions for selectively transmitting and interrupting power to the rectifying circuit, the interrupter assembly also including an actuator for opening the circuit interrupter in response to an interrupt command signal;

a power supply circuit coupled to the power substrate circuit;

a switching device coupled to the actuator, the switching device applying the interrupt command signal to the actuator in response to a control signal;

a capacitive circuit coupled to the direct current bus, the capacitive power for operating the actuator; and a control circuit coupled to the power supply circuit, to the inverting circuit and to the switching device, the control circuit receiving power via the power supply circuit, the control circuit generating drive signals and applying the drive signals to the inverting circuit to drive the motor, the control circuit also generating a control signal and applying the control signal to the switching device to cause interruption of power from the source via the interrupter circuit to the rectifying circuit and to the power supply circuit.

2. The controller of claim 1, wherein the switching device is an insulated gate bi-polar transistor.

3. The controller of claim 1, wherein the switching device is coupled to the direct current bus.

4. The controller of claim 1, wherein the direct current bus includes a high side and a low side and wherein the switching device is coupled across the high and low sides of the direct current bus.

5. The controller of claim 1, wherein the power interrupter assembly includes a manually positionable device coupled to the contactors for selectively opening and closing the circuit interrupter.

6. The controller of claim 5, wherein the manually positionable device can be locked out to prevent the circuit interrupter from closing and thereby preventing power transmission to the controller.

7. In a motor controller including a power substrate circuit, a switching device, a control circuit and a power supply circuit, the power substrate circuit including a rectifying circuit for converting alternating current power from a source to direct current power and applying the direct current power to a direct current bus and inverting circuit coupled to the rectifying circuit via the direct current bus, the inverting circuit converting the direct current power to controlled alternating current power for driving a motor, the switching device providing a circuit interrupt command signal in response to a control signal, the control circuit coupled to the inverting circuit and to the switching device, the control circuit generating drive signals for controlling operation of the inverting circuit and generating and applying the control signal to the switching device to cause interruption of power to the rectifying circuit and the power supply circuit, the power supply circuit coupled to the power substrate circuit and supplying power to the control circuit, a power interrupter module comprising:

a circuit interrupter for coupling to the source via incoming power conductors for supplying power to the rectifying circuit and to the power supply circuit, the circuit interrupter being movable between closed and opened positions for selectively transmitting and interrupting power to the rectifying circuit and to the power supply circuit;

a manually positionable device coupled to the circuit interrupter for selectively opening and closing the circuit interrupter; and an actuator for opening the circuit interrupter in response to the circuit interrupt command signal from the switching device.

8. The power interrupter module of claim 7, wherein the actuator is powered by a capacitive circuit coupled to the direct current bus.

9. The power interrupter module of claim 8, wherein the manually positionable device can be locked out to prevent the circuit interrupter from closing, thereby preventing power transmission to the controller.

10. A controller for regulating the operation of an electric motor comprising:

a power substrate circuit, the power substrate circuit including a rectifying circuit coupled to a plurality of incoming power conductors for converting alternating current power from a source to direct current power, the rectifying circuit providing the direct current power on a direct current bus, and an inverting circuit coupled to the rectifying circuit via the direct current bus, the inverting circuit converting the direct current power to controlled alternating current power for driving the motor;

a power interrupter assembly including a circuit interrupter coupled to the rectifying circuit via the incoming power conductors and configured for coupling to the source, the circuit interrupter being movable between closed and opened positioned for selectively transmitting and interrupting power to the rectifying circuit, the interrupter assembly also including an actuator for opening the circuit interrupter in response to an interrupt command signal;

a power supply circuit coupled to the power substrate circuit;

a switching device coupled to the actuator, the switching device applying the interrupt command signal to the actuator in response to a control signal;

a manually positionable device coupled to the contactors for selectively opening and closing the circuit interrupter; and a control circuit coupled to the power supply circuit, to the inverting circuit and to the switching device, the control circuit receiving power via the power supply circuit, the control circuit generating drive signals and applying the drive signals to the inverting circuit to drive the motor, the control circuit also generating a control signal and applying the control signal to the switching device to cause interruption of power from the source via the interrupter circuit to the rectifying circuit and to the power supply circuit.

11. The controller of claim 10, wherein the switching device is an insulated gate bi-polar transistor.

12. The controller of claim 10, wherein the switching device is coupled to the direct current bus.

13. The controller of claim 10, wherein the direct current bus includes a high side and a low side and wherein the switching device is coupled across the high and low sides of the direct current bus.

14. The controller of claim 10, further comprising a capacitive circuit coupled to the direct current bus, the capacitive circuit storing power for operating the actuator.

15. The controller of claim 10, wherein the manually positionable device can be locked out to prevent the circuit interrupter from closing and thereby preventing power transmission to the controller.

* * * * *